Dec. 7, 1948.                A. J. SCHULTZ                2,455,524
                      TIRE DEFLATION INDICATOR
                        Filed July 16, 1945
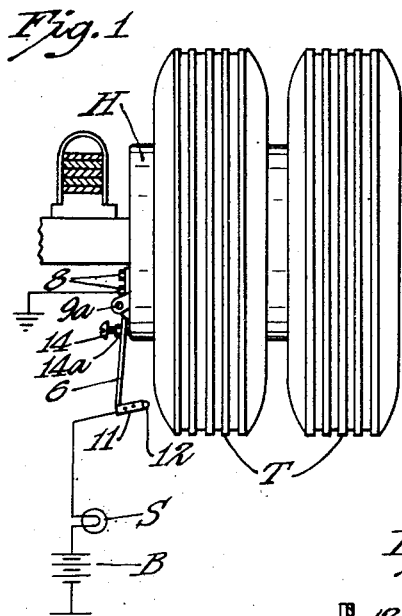
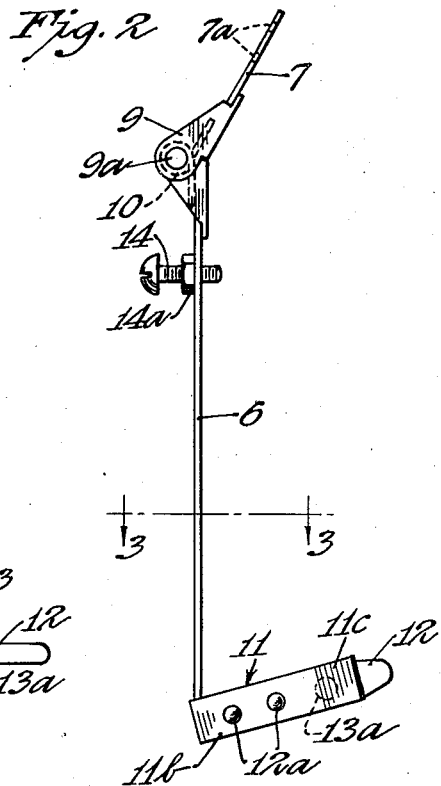
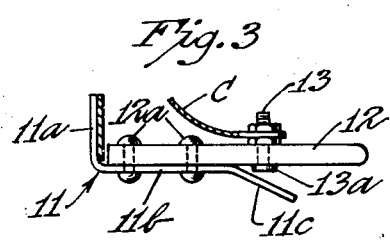
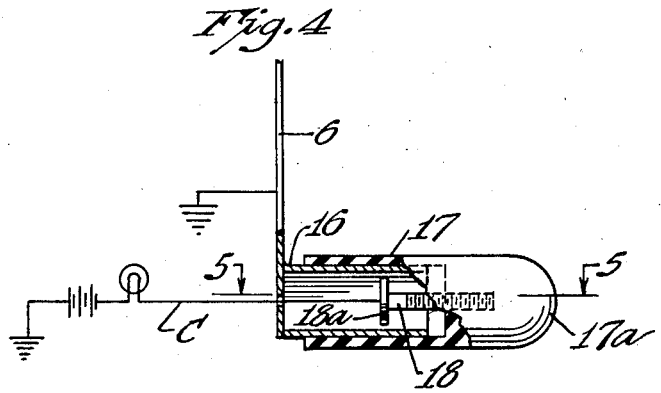
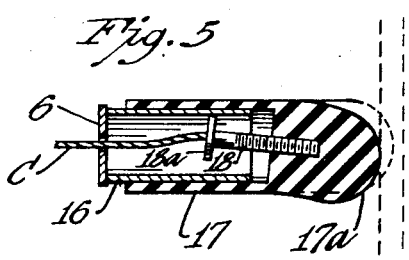
INVENTOR
Anthony J. Schultz
BY
Williamson & Williamson
ATTORNEY Patented Dec. 7, 1948

2,455,524

UNITED STATES PATENT OFFICE 2,455,524

TIRE DEFLATION INDICATOR

Anthony J. Schultz, St. Paul, Minn., assignor of one-half to Edward Crosby, St. Paul, Minn.

Application July 16, 1945, Serial No. 605,399

2 Claims. (Cl. 200—58)

This invention relates to an indicating system or signal device for automatically indicating to the driver of a vehicle when the pressure of one or more of the tires has decreased below a predetermined degree.

It is an object of my invention to provide a simple, efficient and inexpensive tire deflation indicator, which through lateral spreading of the lower portion of the tire upon the ground, when partially deflated, actuates a switch to close an electrical signal circuit.

Another object is the provision of a simplified and accurate circuit controlling device for such a tire deflation indicating system which may be conveniently mounted upon the brake housing, axle or chassis frame of the motor vehicle and which may be very accurately adjusted to respond to lateral spreading of the lower portion of the tire tread due to partial deflation.

More specifically, it is an object in a system and device of the class described, to provide a circuit controller utilizing a deformable and elastic element constructed of rubber or other suitable di-electric material properly disposed relative to the lower portion of the side wall of a tire for displacement and consequent closing of an electrical switch when the tire tread has been spread laterally beyond a predetermined limit due to partial deflation.

These and other objects and advantages of my invention will be more apparent from the following description made in connection with the accompanying drawings, wherein like reference characters refer to the same parts throughout the several views and in which—

Fig. 1 is a rear elevation of a portion of a truck supported on dual tires and having one form of my invention operatively applied thereto;

Fig. 2 is a rear elevation of the signal controlling device of Fig. 1, detached;

Fig. 3 is a cross section taken on the line 3—3 of Fig. 2 with the switch disposed in inoperative position;

Fig. 4 is a fragmentary rear elevation with some portions broken away, of another form of my invention wherein the entire switch mechanism is encased and protected by a deformable, flexible and elastic tire-engaging casing; and Fig. 5 is a section taken on the line 5—5 of Fig. 4.

Referring now to the form of my invention illustrated in Figs. 1 to 3 inclusive, I show the same operatively mounted on the stationary brake drum housing H of one of the rear wheels. The truck on which my signalling or detector system is installed, is supported upon dual tires T at the rear.

The circuit controlling device of my system, as shown in Figs. 1 to 3 comprises an elongated depending arm 6 which may conveniently be constructed from a strap of substantially rigid metal and which as shown, is hinged at its upper end to an attachment strap 7 provided with a pair of attachment apertures drilled therein for receiving suitable securing means such as bolts 8. The hinge connection 9 between strap 7 and arm 6 as shown, comprises spaced overlapping ears at the respective longitudinal sides of the connected parts which are pivoted by transverse pin 9a. A torsion spring 10 surrounds the intermediate portion of pivot pin 9a and has one of its ends fixed to the lower hinge member to urge said pivoted members into the position illustrated in Fig. 2. The device is secured to a suitable stationary part of the automotive vehicle such as for example, the back of the brake housing, as shown in Fig. 1, by bolts 8 with the arm 6 depending radially of the wheel and substantially perpendicular to the ground.

To the lower end of arm 6, a substantially rigid bent metal strip 11 is secured by welding or riveting, said strip being bent to form an angled attachment portion 11a, an outwardly extending medial portion 11b to which the movable or deformable element of the switch is secured and an angularly bent outer end 11c which constitutes a relatively fixed contact for the electrical circuit.

A flexible and elastic contact-carrying shoe or arm 12 in the form of a relatively thick strip which may conveniently be constructed from reinforced rubber or any suitable material having flexing qualities with sufficient elasticity or resiliency to return to a predetermined position, is attached as shown, by rivets 12a to the medial and straight portion 11b of metal strip 11. The outer portion of elastic shoe 12 is free and is opposed to the acutely angled outer end 11c of the metal strip 11 and its extremity is preferably tapered or rounded to facilitate bending of the free end when it is engaged by the revolving tire. The free portion of shoe 12 has affixed thereto and extending transversely therethrough an electrical contact and terminal 13 having a contact disc 13a disposed at the rear side thereof, normally spaced a short distance from the forward face of the metal strip portion 11c.

An adjustment screw 14 is provided in the upper end of depending arm 6 having threaded engagement with a tapped portion of the arm and further provided with a lock nut 14a which is adapted to be tightened against the inner side of arm 6 to lock the screw 14 in a desired adjusted position. The inner end of screw 14 abuts against the rear face of the brake housing or other member on which arm 6 is mounted and by adjustment of said screw it will be readily seen that a very accurate adjustment of the free end or tip of the contact carrying shoe 12 may be provided.

An electrical conductor or wire C which is connected in circuit with an electrical signalling element such as a lamp bulb or buzzer S and with a battery B, depends from the chassis of the automotive vehicle and has its end connected as shown in Figs. 1 and 3 with the terminal 13. The electrical circuit shown is of the grounded type, battery B being grounded to the metallic frame of the vehicle and connected with the electrical signalling element S which in turn, is connected with wire C. The metal strip 11 is connected by depending arm 6 with the brake drum housing 8 and through the housing, is grounded to the frame. Thus, when movable contact element 13a carried by the di-electric shoe 12, is moved into engagement with the acutely angled outer end of strip 11, the circuit is completed through ground.

In installing my apparatus, the attachment strap 7 and pivotally connected arm 6 are disposed substantially radially of the associated wheel and preferably perpendicularly to the ground or supporting surface for the tire. The lower end of arm 6 is preferably disposed a few inches above the ground line with its out-turned conductive strip 11 extending in the direction of the inner cheek of the adjacent tire. Attachment strap 7 may then be secured by suitable means such as bolts 8 whereafter, adjustment screw 14 is manipulated to cause the extremity of the di-electric shoe 12 to be disposed a short distance from the lower portion of the tire trend. To obtain a precise adjustment for a predetermined partial inflation, the related tire may be partially deflated to the predetermined under-pressure and the adjustment screw on lock collar manipulated to cause the tip of di-electric shoe 12 to abut against the lower tread in such partially deflated condition. Thereafter, when the tires are again inflated to the normal and desired pressure, the proper spaced relation of shoe 12 and the treads is obtained. In this connection, it will be noted that the torsion spring 10 yieldingly retains arm 6 in its extreme adjusted position.

One of my devices is supplied for each of the rear wheels of the automotive vehicle whether supported on dual or single tires and if desired, devices may also be supplied for the front wheels of the vehicle, although this is not usually necessary.

In operation, when either of the dual tires T become partially deflated, a lateral bulging occurs at the lower portion of the tread of the tire disposed in juxta-position to the di-electric shoe 12. The revolution of the tire in travel and frictional engagement thereof with the free end of member 12, pushes the shoe rearwardly into the dotted line position shown in Fig. 3 where the electrical contact disc 13a engages the angled contact portion 11c of metal strip 11, thereby closing the circuit. The closing of this circuit operates an electrical visual or audible signal and may constitute an auxiliary circuit through the horn of the automotive vehicle, thus indicating to the driver that one of the rear tires is partially or totally deflated. Signal S is usually mounted on the instrument board or dash of the vehicle.

In Figs. 4 and 5, another form of my invention is illustrated which has in certain respects, superior advantages to the form first described.

The attachment strap and pivotal connection of the depending arm 6 of this second form is not illustrated as the same are identical with the form previously described. In this second form, a conductive tubular element 16 is welded or otherwise conductively secured to the lower end of arm 6 and extends outwardly and laterally in the direction of the opposed lower side wall portion of the associated tire T. A detachable di-electric and elastic nipple 17 is telescopically mounted over the medial and outer portion of tubular member 16 being constructed, as shown, of flexible rubber or other suitable material of flexible, elastic and di-electric characteristics. Nipple 17 terminates in a rounded, solid nose 17a which is adapted to be frictionally engaged and distorted or displaced by engagement with the partially flatted side wall of the lower portion of the associated tire. The outer portion of nipple 17 as shown, is solid and is axially and internally apertured to receive and hold an electrical contact member 18 shown in the form of a screw or bolt which extends normally axially of the metal tube 16 and is provided with a contact head or annular flange 18a normally spaced concentrically a very short distance from engagement with the inner periphery of the conductive tube 16. A conductor or wire C, properly insulated, extends through an aperture in the lower end of arm 6 and also through the greater portion of conductive tube 16 and has its end firmly connected in electrical contact with the end of contact bolt 18 carried by the nipple.

In Fig. 5, my device last described is shown operated by frictional engagement of a partially deflated tire with the nose 17a of the di-electric nipple. Flexing of the outer portion of nipple 17 due to revolution of the associated tire, tilts the contact bolt 18 as shown in Fig. 5, causing the flanged end or head 18a to contact with the interior of the conductive tube 16, thereby completing the circuit through the electrical signalling element. In Fig. 5 the heavy dotted line indicates the engaging position of the side wall of the associated tire while the light dotted line indicates the normal position of the tire when inflated to the requisite degree.

With the form of my invention last described, it will be seen that all parts of the electrical switch proper of my device, are completed encased and protected from dust, moisture and grease. The invention has demonstrated a high efficiency and accuracy for the purposes intended.

It will, of course, be understood that various changes may be made in the form, details, arrangement and proportions of the parts without departing from the scope of my invention.

What is claimed is:

1. In tire deflation signalling apparatus, a depending arm adapted to be secured to a vehicle substantially radially of a wheel thereof with its lower end opposed to the side wall of a pneumatic tire, a tubular conductive member secured to the lower portion of said depending arm and extending substantially perpendicular to the adjacent side wall of the associated tire, a nipple constructed of di-electric material, attached to the outer end of said tubular member and disposed concentrically thereof, said nipple having a resilient and deflectable free end adapted to be engaged by said side wall when the associated tire is deflated below a predetermined pressure, said nipple internally carrying an axially disposed, electrical contact member, said member extending into said tubular member and being normally disposed concentrically and in spaced relation with the inner periphery of said tubular member.

2. In tire deflation signalling apparatus, a depending, substantially rigid arm adapted to be secured to a vehicle substantially radially of a wheel thereof with the lower end thereof opposed to the side wall of a pneumatic tire, a tubular, conductive member secured to the lower portion of said arm and extending laterally thereof and perpendicularly to the adjacent side wall of the associated tire, a rubber nipple attached to the outer end of said tubular member and disposed concentrically thereof and having a deflectible free end adapted to be engaged by said wall when the associated tire is deflated below a predetermined pressure, said nipple internally carrying an axially disposed electrical contact member, said member extending into said tubular conductive member being normally disposed in spaced relation thereof, means for restraining said arm against oscillation axially of the associated wheel and threadedly adjustable means for varying the normal spaced relation of the lower end of said arm and the extermity of said nipple with respect to the adjacent side wall of the associated tire.

ANTHONY J. SCHULTZ.

REFERENCES CITED

The following references are of record in the file of this patent:

UNITED STATES PATENTS

| Number | Name | Date |
|---|---|---|
| 1,785,614 | Boyer | Dec. 16, 1930 |
| 1,883,040 | Solve | Oct. 18, 1932 |
| 2,144,187 | Kotch | Jan. 17, 1939 |

Certificate of Correction

Patent No. 2,455,524.

December 7, 1948.

ANTHONY J. SCHULTZ

It is hereby certified that errors appear in the printed specification of the above numbered patent requiring correction as follows:

Column 5, line 20, claim 2, before the word "wall" insert *side*; column 6, line 3, same claim, before "being" insert *and*; line 8, same claim 2, for "extermity" read *extremity*;

and that the said Letters Patent should be read with these corrections therein that the same may conform to the record of the case in the Patent Office.

Signed and sealed this 29th day of March, A. D. 1949.

[SEAL]

THOMAS F. MURPHY,
*Assistant Commissioner of Patents.*